United States Patent [19]
Ishibashi et al.

[11] Patent Number: 5,943,546
[45] Date of Patent: Aug. 24, 1999

[54] GRADIENT FUNCTION MATERIAL

[75] Inventors: Hirotaka Ishibashi; Koichi Hayashi; Hiroyuki Nagayama, all of Fukuoka, Japan

[73] Assignee: Toto Ltd., Fukuoka, Japan

[21] Appl. No.: 08/564,777

[22] Filed: Nov. 29, 1995

Related U.S. Application Data

[62] Division of application No. 08/246,134, May 19, 1994, Pat. No. 5,653,924, which is a continuation of application No. PCT/JP93/01367, Sep. 24, 1993, abandoned.

[30] Foreign Application Priority Data

| Sep. 24, 1992 | [JP] | Japan | 4-279331 |
| Mar. 16, 1993 | [JP] | Japan | 5-55991 |
| Aug. 30, 1993 | [JP] | Japan | 5-214409 |

[51] Int. Cl.$^6$ .................................. B22F 3/00
[52] U.S. Cl. .................. 428/547; 428/548; 428/551; 428/552; 428/564; 428/565; 75/235; 75/236; 75/244; 75/245; 75/246; 75/248
[58] Field of Search .................... 428/547, 548, 428/551, 552, 564, 565; 75/235, 236, 244, 245, 246, 248

[56] References Cited

U.S. PATENT DOCUMENTS

| 2,431,474 | 11/1947 | Gaudenzi et al. | 174/152 |
| 2,464,517 | 3/1949 | Kurtz | 75/22 |
| 2,982,014 | 5/1961 | Meyer-Hartwig | 29/182.5 |
| 3,148,981 | 9/1964 | Ryshkewitch | 75/206 |
| 3,360,348 | 12/1967 | Schreiner | 29/182.1 |
| 3,432,365 | 3/1969 | Katz et al. | 136/237 |
| 3,719,519 | 3/1973 | Perugini | 117/71 M |
| 3,766,769 | 10/1973 | Fuchs, Jr. et al. | 75/256 |
| 4,398,952 | 8/1983 | Drake | 419/18 |
| 4,602,956 | 7/1986 | Partlow et al. | 75/235 |
| 4,647,415 | 3/1987 | Schafft | 264/86 |
| 4,798,694 | 1/1989 | Sugata et al. | 264/60 |
| 4,822,312 | 4/1989 | Passmore | 445/49 |
| 4,822,692 | 4/1989 | Koehler | 428/547 |
| 4,828,930 | 5/1989 | Koehler | 428/547 |
| 4,851,190 | 7/1989 | Bowen et al. | 419/66 |
| 5,110,781 | 5/1992 | Griffiths et al. | 502/335 |
| 5,167,813 | 12/1992 | Iwata et al. | 210/219 |

*Primary Examiner*—Bruce F. Bell
*Attorney, Agent, or Firm*—Carrier, Blackman & Associates, P.C.; Joseph P. Carrier; William D. Blackman

[57] ABSTRACT

A disclosed gradient function material is produced by molding and thereafter firing a slurry which contains a plurality of groups of particles having different specific gravities. The plurality of groups of particles include at least a first group of particles and a second group of particles. The first group of particles comprises a group of non-metal particles having a specific gravity ranging from about 3 to 7 and a maximum particle diameter equal to or smaller than a deflocculation limit, said non-metal particles being made of one or more materials selected from the group consisting of an oxide, a carbide, a nitride, and an oxynitride. The second group of particles comprises a group of metal particles having a specific gravity which is about 1.5 times the specific gravity of said first group of particles, and particle diameters distributed across the deflocculation limit. The gradient function material is manufactured by preparing a slurry containing a plurality of groups of particles and/or a plurality of slurries, and supplying the slurry or slurries into a porous mold to form a deposited region in the porous mold initially primarily influenced by way of attraction of the porous mold and subsequently primarily influenced by a deflocculating effect of the particles in the slurry or slurries or under the influence of the gravity.

6 Claims, 16 Drawing Sheets

FIG. 10

| Item | | 1st embodiment | Prior ex. 1 (centrifugal separation) | Prior ex. 2 (solid-liquid separation) |
|---|---|---|---|---|
| Average bending strength (Kg/cm$^2$) (RT°C) | | 2700 (n = 17) | 680 (n = 23) | 260 (n = 17) |
| Specific resistance (Ω·cm) | Nickel side | 5.4 × 10$^{-8}$ | 5.3 × 10$^{-8}$ | 5.1 × 10$^{-8}$ |
| | Alumina side | > 10$^{14}$ | > 10$^{14}$ | 2 × 10$^{14}$ |
| Average filling percentage (%) | Forming body | 55 | 37 (after being hydrated and dried) | 42 (after being hydrated and dried) |
| | Fired body | 97 (without water absorption) | 76 (with water absorption) | 68 (with water absorption) |
| Ground surface after being fired | Nickel side | Bores (none) | Bores (5 ~ 50 mm, many) | Bores (5 ~ 50 mm, many) |
| | Alumina side | Hair cracks, bores (none) | Hair cracks (yes), bores (10 μm or more) | Hair cracks (many), bores (10 μm or more) |
| Average shrinkage factor (%) in planar direction Fired body / forming body | Nickel side | 81.3 | 73.6 | 76.2 |
| | Alumina side | 82.8 | 91.0 | 93.6 |
| Thickness of a gradient layer that can be formed | Minimum | 400 μm | 2.0 mm | 2.0 mm |
| | Maximum | 13.0 mm | 10.0 mm | 8.0 mm |
| Failure ratio due to heat shock durability (n=25) (ΔT°C) | 200°C | 0 | 68 | 75 |
| | 400°C | 0 | 87 | 96 |
| Shrinkage factor (%) per sample (n = 10) Variations of fired body / forming body | | 2 % or lower | 7 % | 9 % |
| Laminar cracks of gradient layers (Fired body) | | None | In several locations | Seen on all samples |

FIG. 11

| Item | 1st embodiment | Prior example 1 (centrifugal separation) | Prior example 2 (solid-liquid separation) |
|---|---|---|---|
| Forming apparatus | Plaster | Centrifugal separator, CIP | Filter, Press |
| Dehydrating step | None | Yes | Yes |
| State after being formed | Solid (can be handled) | Nearly cake (can be handled) | Cake (can be handled) |
| Yield | Good | Fair | Failure |
| Manufacturing cost | Inexpensive | Expensive | Expensive |
| Degree of freedom after being formed | Can be inclined simultaneously in planar and transverse directions | One direction only | One direction only |
| Net shape* Planar direction | ○ | × | × |
| Net shape* Transverse direction | ○ | △ | × |

* Indicates how much the dimensions after being fired can be predicted upon forming.

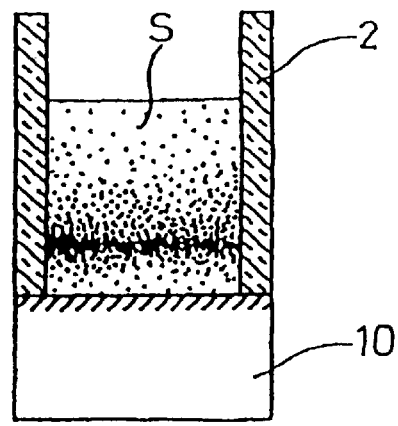
FIG.14(a)
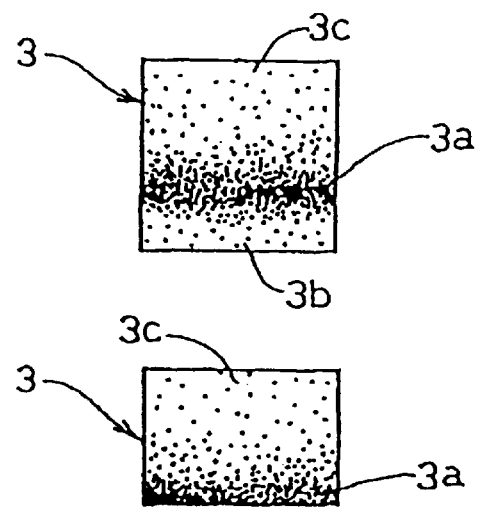
FIG.14(b)
FIG.14(c)
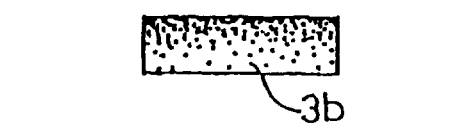
FIG.14(d)
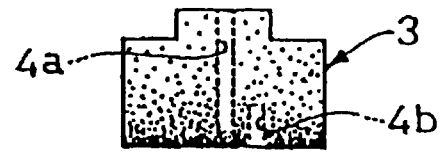
FIG.14(e)
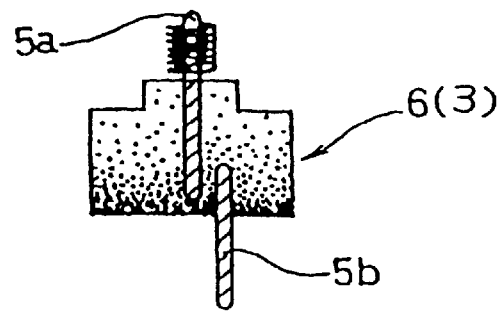

GRADIENT FUNCTION MATERIAL

This is a divisional of application Ser. No. 08/246,134 filed May 19, 1994, now U.S. Pat. No. 5,653,924 which is a continuation of PCT Application Serial No. PCT/JP93/01367 filed Sep. 24, 1993 (now abandoned).

TECHNICAL FIELD

The present invention relates to a gradient function material whose characteristics continuously vary transversely thereacross, and a method of manufacturing such a gradient function material.

BACKGROUND ART

It has heretofore been known to use a gradient function material as a heat resistant material in locations where the difference between inner and outer temperatures is very large, e.g., as a surface layer material for a space shuttle.

Conventional gradient function materials have been produced by either making, laminating, pressing, and thereafter firing a number of green sheets which have slightly different compositions, or an evaporation process such as CVD or the like.

However, a gradient function material which is produced by laminating green sheets does not have a completely continuous range of compositions, but has compositions varying stepwise transversely thereacross. Therefore, such a gradient function material fails to fully perform the desired function thereof.

A gradient function material which is manufactured by an evaporation process such as CVD or the like can have a completely continuous range of compositions. However, since the thickness of a film that can be deposited in one evaporation process is very small, it is very difficult from the standpoint of cost and technology to obtain a gradient function material having a required thickness.

There have been proposed methods of achieving a completely continuous range of compositions and maintaining a desired material thickness as disclosed in Japanese laid-open patent publications Nos. 3-165832 and 3-274105.

According to the method disclosed in Japanese laid-open patent publication No. 3-165832, a first slurry containing Ti particles or the like and a second slurry containing SiC particles or the like are prepared and supplied to a filtering tank which has a filter, while continuously varying the mixing ratio of the first and second slurries. When the slurries are drawn by a vacuum pump, a cake having a gradient composition is formed on the filter. The cake is then formed to shape while at the same time it is being dehydrated, after which the shaped cake is fired.

According to the method shown in Japanese laid-open patent publication No. 3-274105, a slurry is prepared which contains a plurality of types of particles having different particle size distributions. The slurry is put in a container made of film (corresponding to the filter disclosed in Japanese laid-open patent publication No. 3-165832), and a cake having a gradient composition is formed in the container by centrifugal separation or sedimentation. The cake is then formed to shape while at the same time it is being dehydrated, after which the shaped cake is fired.

However, the apparatus which are required are complex and expensive because the vacuum pump and a rotating device for generating the centrifugal force are necessary.

The gradient layer that is formed is of an increased total thickness of several millimeters as necessitated by the handling of the cake. Therefore, the gradient layer has a large heat capacity and is of a structure vulnerable to a heat shock.

FIG. 24 is an enlarged view showing the manner in which particles are attracted when a filter or a container of film is used. Particles 202 are concentrated on holes 201 in a filter 200, creating gaps in regions other than the holes 201. Therefore, a cake that is produced has a water content of 30% or more. Since such a cake cannot directly be fired, it has heretofore been customary to dehydrate the cake, making the manufacturing process complicated.

When a cake is dehydrated and dried, the product tends to crack and shrinks to a very large degree due to dehydration and drying. Therefore, it is necessary to cut out the product after the cake is dehydrated and dried.

FIG. 25 is a cross-sectional view of a gradient layer 204 which is formed according to a conventional method. Inasmuch as particles are attracted under suction forces applied in a constant direction in the conventional method, the laminae of the gradient layer 204 are arranged as horizontal stripes, and are liable to peel off because they are superposed too orderly in the transverse direction.

Furthermore, gradient function materials manufactured according to the conventional methods have shapes that are limited to simple shapes. Specifically, according to the conventional methods, since water has to be removed from a cake in a pressing step, the gradient layer would be deformed out of an orderly configuration when dehydrated if it were of a complex shape.

Consequently, the prior methods proposed in Japanese laid-open patent publications Nos. 3-165832 and 3-274105 suffer the following drawbacks:

a) As the vacuum pump and the rotating device for generating the centrifugal force are necessary, the apparatus is complex and expensive.

b) The gradient layer which is formed is of a large thickness of several millimeters as necessitated by the handling of the cake. Therefore, the gradient layer has a large heat capacity and is of a structure vulnerable to a heat shock.

c) If a filter or a film is used, the water content of a cake is large (30% or more). Because such a cake cannot directly be fired, it is indispensable to dehydrate the cake, making the manufacturing process complex.

d) When a cake is dehydrated and dried, the product tends to crack and shrinks to a very large degree due to dehydration and drying. Therefore, it is necessary to cut out the product after the cake is dehydrated and dried.

e) Inasmuch as particles are attracted under suction forces applied in a constant direction, the laminae of the gradient layer are arranged as horizontal stripes, and are liable to peel off because they are superposed too orderly in the transverse direction.

f) Gradient function materials manufactured according to the conventional methods have shapes that are limited to simple shapes. Specifically, according to the conventional methods, since water has to be removed from a cake in a pressing step, the gradient layer would be deformed out of an orderly configuration when dehydrated if it were of a complex shape.

g) The composition varies such that a certain component either increases or decreases in the transverse direction. Therefore, it has not been conventionally possible to obtain any gradient function materials which have a composition peak intermediate in their transverse direction.

DISCLOSURE OF THE INVENTION

The present invention has been made in view of the foregoing problems attendant conventional gradient function materials and the conventional methods and apparatus for forming same. It is therefore an object of the present invention to provide a gradient function material which is composed of particles having a composition continuously varying in a transverse direction as if in transversely superposed corrugated patterns, and which is made from a single slurry containing a group of particles having diameters according to a deflocculating effect or a mixed slurry containing a plurality of types of particles using a porous mold such as a plaster mold rather than a filter or a film, and a method of manufacturing such a gradient function material.

According to the present invention, a gradient function material is produced by molding and thereafter firing a slurry which contains a plurality of groups of particles having different specific gravities, characterized in that the plurality of groups of particles includes at least a first group of particles and a second group of particles, the first group of particles comprises a group of non-metal particles having a specific gravity ranging from about 3 to 7 and a maximum particle diameter equal to or smaller than a deflocculation limit, the non-metal particles being made of one or more materials selected from the group consisting of an oxide, a carbide, a nitride, and an oxynitride, and the second group of particles comprises a group of metal particles having a specific gravity which is about 1.5 times the specific gravity of the first group of particles, and particle diameters distributed across the defloccuation limit.

The first group of particles may preferably comprise a group of non-metal particles having a specific gravity ranging from about 3 to 7 and a maximum particle diameter equal to or smaller than a deflocculation limit of about 6.0 $\mu$m, the non-metal particles being made of one or more materials selected from the group consisting of alumina, zirconia, magnesia, silica, silicon carbide, titanium carbide, silicon nitride, and AlON, and the second group of particles may comprise a group of metal particles of a high melting point which have a specific gravity which is about 1.5 times the specific gravity of the first group of particles, and particle diameters distributed across the deflocculation limit of about 6.0 $\mu$m, the metal particles being made of an alloy containing at least one material selected from the group consisting of nickel, tungsten, molybdenum, tantalum, and chromium.

The gradient function material according to the invention may be manufactured by the steps of preparing a first slurry containing at least a group of small-specific-gravity particles having a small specific gravity and a second slurry containing at least a group of large-specific-gravity particles having a large specific gravity, supplying a gravity of one of the first slurry and the second slurry singly into a porous mold to form a deposited region in the porous mold, and mixing quantities of the first slurry and the second slurry into a mixed slurry and supplying the mixed slurry into the porous mold to allow the particles to be deposited successively from those particles in the mixed slurry which are more susceptible to gravity, onto the deposited region.

The gradient function material according to the invention may also be manufactured by the steps of preparing a first slurry containing at least a group of small-specific-gravity particles having a small specific gravity and a second slurry containing at least a group of large-specific-gravity particles having a large specific gravity, mixing the first slurry and the second slurry into a mixed slurry and supplying the mixed slurry into a porous mold to allow the particles to be deposited successively from those particles which are more susceptible to gravity.

If the porous mold comprises a plaster mold, then a gradient layer having a water content of about 5%, rather than a cake having a water content of 30% or more which has heretofore been produced using a filter, is deposited directly in the mold.

The gradient function material may be arranged to have such a continuously varying composition that there exists a large-specific-gravity region which is occupied mostly by a group of large-specific-gravity particles having a greatest specific gravity, among the groups of particles, between upper and lower ends thereof in the transverse direction, and a proportion of a group of small-specific-gravity particles having a small specific gravity progressively increases transversely from the large-specific-gravity region toward both ends in the transverse direction.

The gradient function material according to the invention may further be manufactured by the steps of preparing a single slurry containing at least a group of small-specific-gravity particles having a small specific gravity and a mixed slurry containing at least the group of small-specific-gravity particles and a group of large-specific-gravity particles having a large specific gravity, supplying the single slurry into a porous mold to form a deposited region made of the group of small-specific-gravity particles in the porous mold, and supplying the mixed slurry into the porous mold to allow the particles to be deposited successively from those particles in the mixed slurry which are more susceptible to gravity, onto the deposited region made of the group of small-specific-gravity particles, thereby forming a gradient function material forming body. In addition, a step of taking the gradient function material forming body out of the porous mold and removing the deposited region made of the group of small-specific-gravity particles from the gradient function material forming body may be included.

If the porous mold comprises a plaster mold, then when a mixed slurry containing a group of particles having a small specific gravity and a group of particles having a large specific gravity is supplied into the plaster mold, a deposited region is initially formed in contact with a surface of the mold as dominated by being attracted by the plaster mold, but not by a specific gravity and a deflocculated condition, the deposited region having a composition substantially equal to the composition of the slurry. After the deposited region is formed, another deposited region is formed thereon as dominated by the specific gravity and the deflocculated condition. Accordingly, the gradient function material can be manufactured which has a composition peak in an intermediate region thereof.

Other objects, advantages and salient features of the present invention will become apparent from the following detailed description which, when taken in conjunction with the annexed drawings, discloses preferred embodiments of the invention.

BRIEF DESCRIPTION OF THE DRAWINGS

FIG. 10 is a comparison table showing characteristics of a gradient function material manufactured by the method of manufacturing a gradient function material according to the first embodiment and conventional gradient function materials after they are fired;

FIG. 11 is a comparison table showing characteristics of the method of manufacturing a gradient function material according to the first embodiment and conventional methods;

FIGS. 14(a) through 14(e) are cross-sectional views showing a process of manufacturing a sealing cap for a metal vapor discharge lamp as a gradient function material according to the manufacturing process shown in FIG. 12(a);

BEST MODE FOR CARRYING OUT THE INVENTION

Preferred embodiments of gradient function materials according to the present invention will hereinafter be described below with reference to the drawings.

Figure 1A:
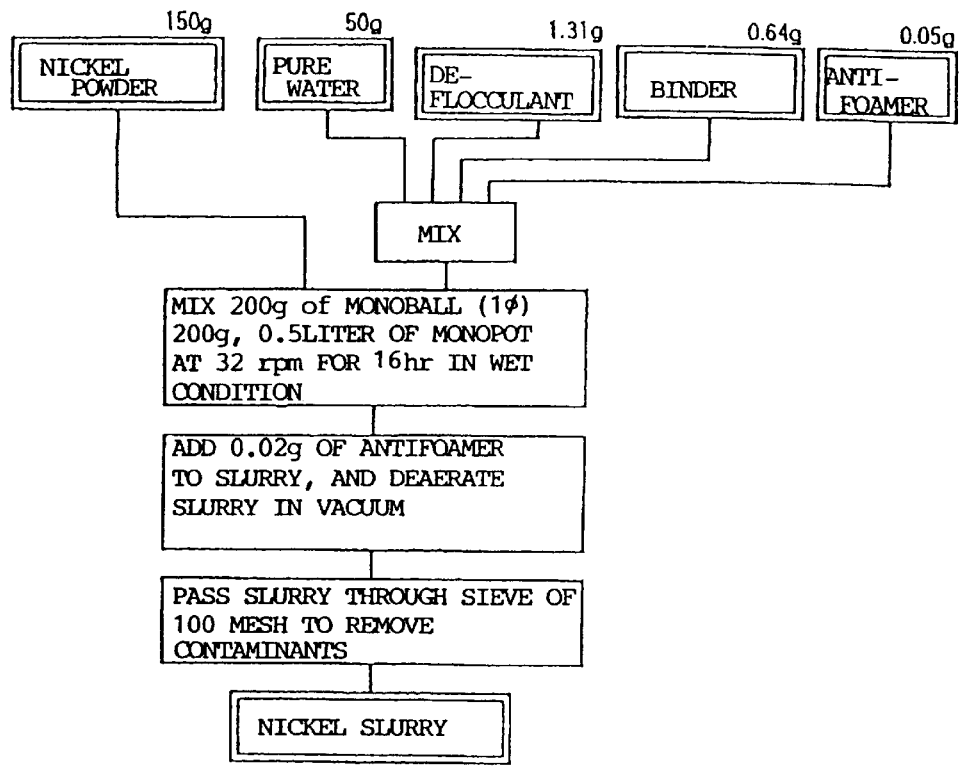
FIG. 1(a) is a flowchart of a process of preparing a nickel slurry used in the manufacture of a gradient function material in a method of manufacturing a gradient function material according to a first embodiment of the present invention.
Figure 1B:
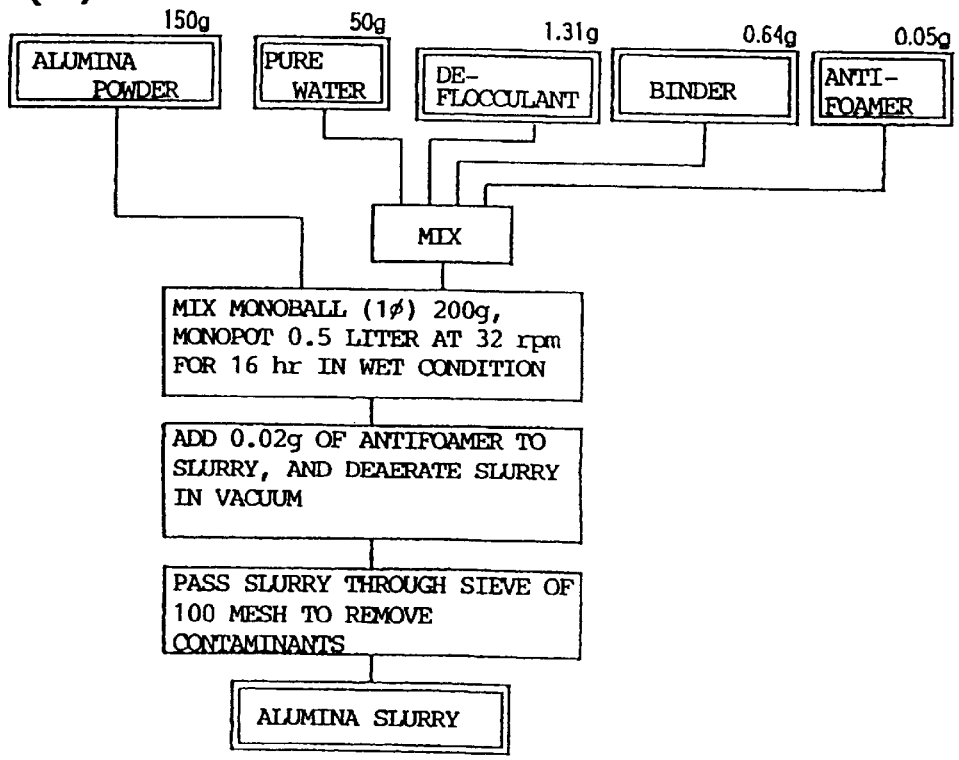
FIG. 1(b) is a flowchart of a process of preparing an alumina slurry used in the manufacture of a gradient function material in the above method of manufacturing a gradient function material.

FIGS. 1(a) and 1(b) are flowcharts of processes of preparing a nickel slurry and an alumina slurry, respectively, used in the manufacture of a gradient function material in a method of manufacturing a gradient function material according to a first embodiment of the present invention. The particle diameters, specific gravities, and other data of nickel and alumina powders as materials are shown in the table 1 below.

To prepare a nickel slurry, a mixture of pure water, a deflocculant, a binder, and an antifoamer which are weighed as shown in FIG. 1(a) and a nickel powder which is weighed as shown in FIG. 1(a) are mixed in a monopot, after which an antifoamer is added to the mixture. The mixture is then deaerated in vacuum and sieved to remove floating substances and contaminants, thus producing a nickel slurry.

Similarly, an alumina slurry is produced by weighing, mixing, and processing the materials as shown in FIG. 1(b).

TABLE 1

|  | Nickel powder | Alumina powder |
|---|---|---|
| Average particle diameter ($\mu$m) | 1.2 | 0.5 |
| Particle size distribution ($\mu$m) | 0.3~9.0 | 0.1~2.0 |
| Shape (—) | Nearly sphere | Nearly sphere |
| Specific gravity (—) | 9.845 | 3.986 |
| Purity (wt %) | 99.50 | 99.99 |
| Resistivity ($\Omega \cdot$ cm/ 0° C.) | $6.8 \times 10^{-6}$ | $1.0 \times 10^{14}$ |
| Coefficient of thermal expansion $\times 10^{-6}$/° C. | 12.8 | 7.0 |

The deflocculant comprises polycarboxylic acid (A6114 manufactured by Toagosei Chemical Industry Co., Ltd.). The binder comprises CMC (carboxymethyl cellulose, which is sold as SMR-10M manufactured by The Shin-Etsu Chemical Co., Ltd.). The antifoamer comprises polyglycol (CE-457 manufactured by Nippon Oils & Fats Co., Ltd).

Figure 2:
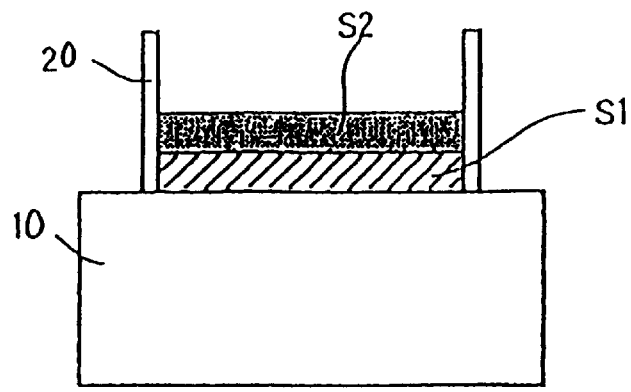
FIG. 2 is a schematic view of a manufacturing apparatus for experimental use in the method of manufacturing a gradient function material according to the first embodiment.

FIG. 2 is a schematic view of a manufacturing apparatus which is used primarily for experimentation and can be used to manufacture a gradient function material. A process for manufacturing a gradient function material using nickel and alumina slurries which have been prepared according to the above processes will be described below.

A glass tube 20 coated with wax on its inner surface and having a height of 30 mm and a diameter of 40 mm is set on a plaster mold 10 (such as a mold which meets the requirements under JIS R9111) held at rest which has a height of 60 mm and a diameter of 100 mm. First, 3 ml. of nickel slurry S1 is poured into the glass tube 20. About 6 minutes later, a deposited layer having a thickness of 0.5 mm is formed on the plaster mold 10.

Figure 3:
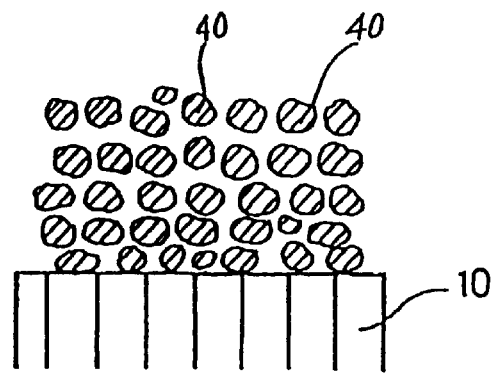
FIG. 3 is an enlarged view showing the deposited condition of a deposited layer on a plaster mold, which is produced by the manufacturing apparatus shown in FIG. 2.
Figure 24:
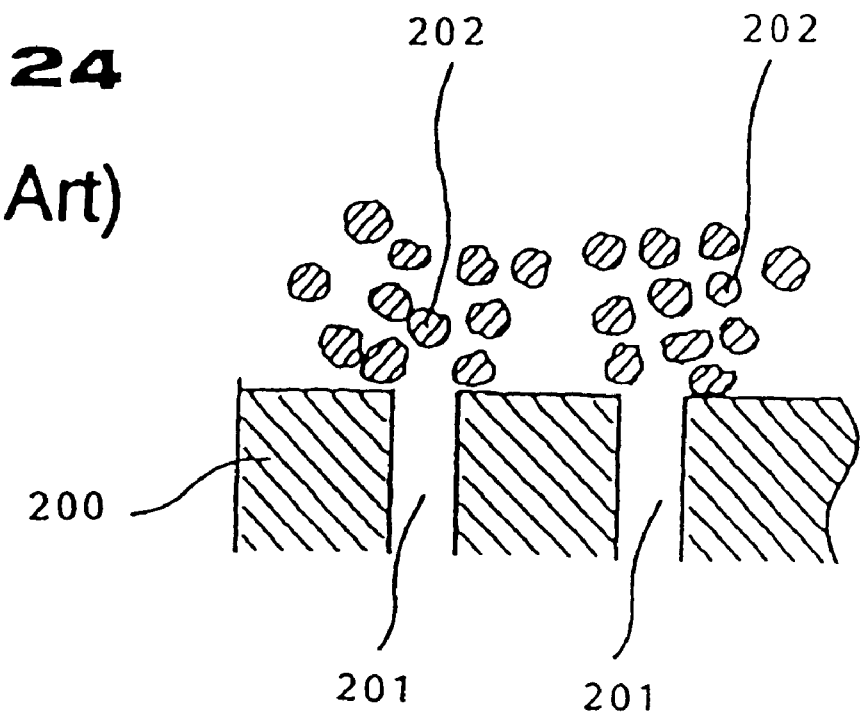
FIG. 24 is an enlarged view showing the manner in which a group of particles in a slurry are attracted to a filter used in a conventional method of manufacturing a gradient function material.

FIG. 3 is an enlarged view showing the deposited condition of the deposited layer. A comparison with the deposited condition shown in FIG. 24 indicates that nickel particles 40 are uniformly deposited on the surface of the plaster mold 10 because the area of pores per unit surface area of the plaster mold 10 is far greater than the filter 200 used in the conventional method.

Then, a mixed slurry S2 of 1.5 ml. of nickel slurry and 4 ml. of alumina slurry is poured into the glass tube 20.

Figure 4:
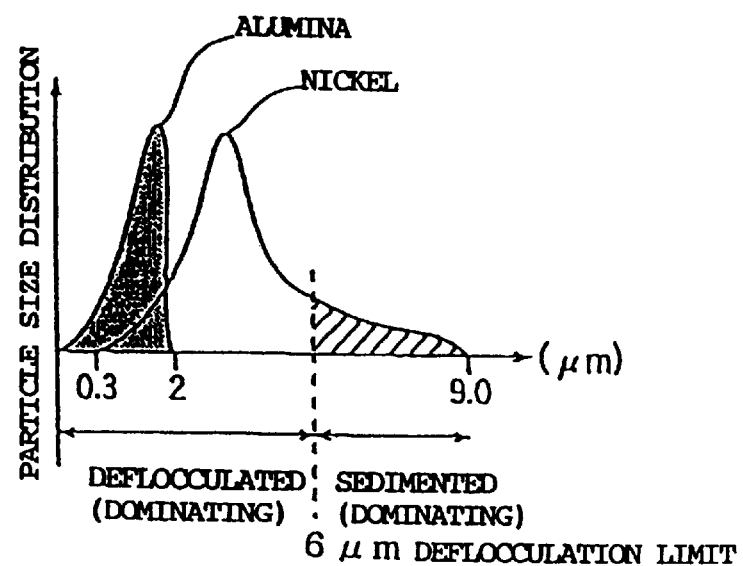
FIG. 4 is a graph showing a deflocculating effect and a particle size distribution of each of a nickel slurry and an alumina slurry for use in the method of manufacturing a gradient function material according to the first embodiment.

FIG. 4 is a graph showing a deflocculating effect and a particle size distribution of each of the nickel slurry and the alumina slurry. As shown in the Table 1 above, the nickel slurry has a particle size distribution ranging from 0.3 $\mu$m to 9.0 $\mu$m, and the alumina slurry has a particle size distribution ranging from 0.1 $\mu$m to 2.0 $\mu$m. The limit particle diameter within which the deflocculating effect is exhibited is about 6.0 $\mu$m.

As a result of the mixed slurry S2 which has been poured into the glass tube 20, the nickel particles which have a particle diameter of 6.0 $\mu$m or greater are deposited, and the nickel and alumina particles which have a particle diameter of 6.0 $\mu$m or smaller are suspended in the slurry while being repelled by each other.

Figure 5:
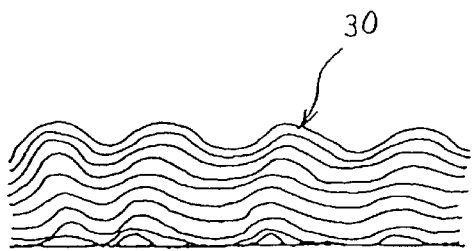
FIG. 5 is a cross-sectional view of a gradient layer in a gradient function material that is produced by the method of manufacturing a gradient function material according to the first embodiment.

However, the particles in the deflocculated condition are gradually deposited due to gravity. Because the specific gravity of nickel is larger than (more than twice) the specific gravity of alumina, more nickel particles are deposited on the deposited layer of nickel particles which has first been formed on the plaster mold 10 than alumina particles. In this manner, a gradient layer 30 is formed as shown in the cross-sectional view of FIG. 5.

Figure 6A:
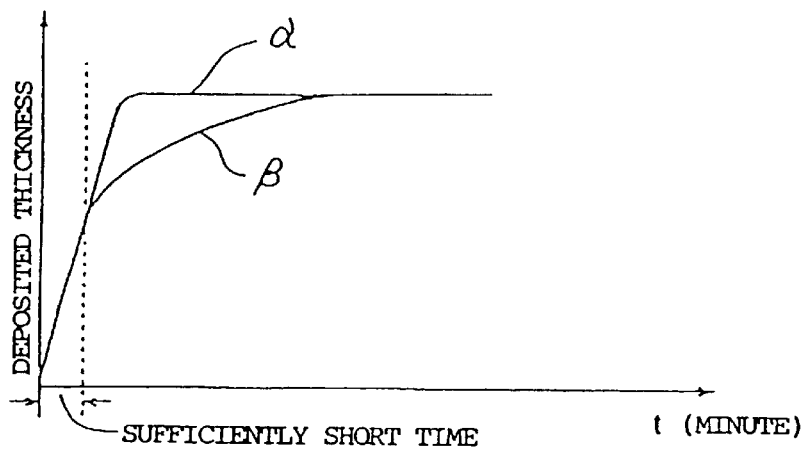
FIG. 6(a) is a graph showing the deposited layer growth rates on a plaster mold of nickel particles when they are in a deflocculated condition and not in a deflocculated condition.
Figure 6B:
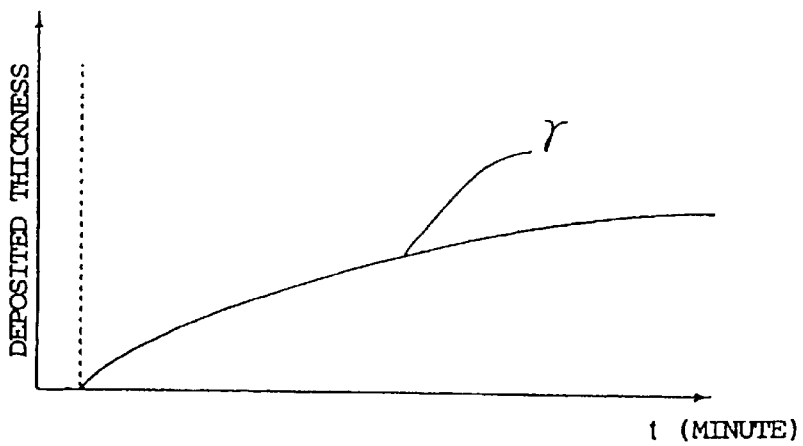
FIG. 6(b) is a graph showing the deposited layer growth rate on a plaster mold of alumina particles when they are in a deflocculated condition.
Figure 6C:
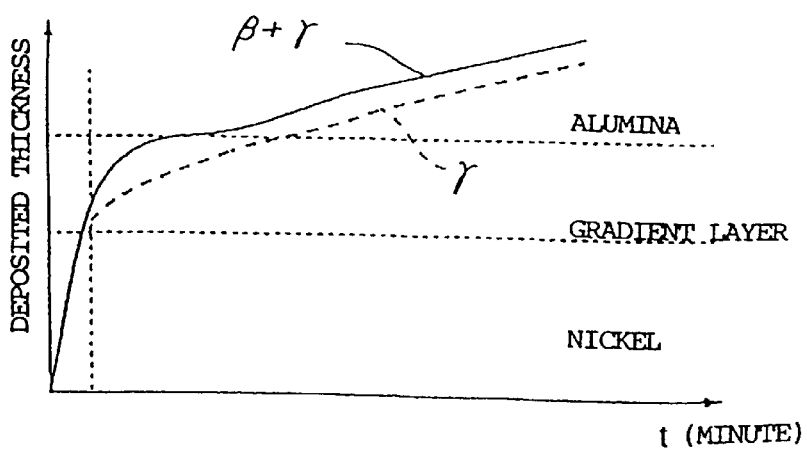
FIG. 6(c) is a graph showing the deposited layer growth rate on a plaster mold of a mixture of nickel and alumina particles.

FIGS. 6(a) through 6(c) show the relationship between time and deposited thicknesses for the deposited layer growth rates of various particle groups on the plaster mold 10. FIG. 6(a) is a graph showing the deposited layer growth rates of nickel particles. In FIG. 6(a), the curve $\alpha$ indicates the deposited layer growth rate of nickel particles which are not in a deflocculated condition (with no deflocculant), and the curve $\beta$ indicates the deposited layer growth rate of nickel particles which are in a deflocculated condition (with a deflocculant). In FIG. 6(b), the curve $\gamma$ represents the deposited layer growth rate of alumina particles which are in a deflocculated condition (with a deflocculant). In FIG. 6(c), curve $\beta+\gamma$ represents the actual deposited layer growth rate in the manufacturing method according to the first embodiment. In the first embodiment, the formation of a desired deposited layer is completed in 25–30 minutes.

The composition of the nickel and alumina particles in the gradient layer 30 continuously varies in a transverse direction thereof as if in transversely superposed corrugated patterns. Specifically, the composition of the nickel and alumina particles varies in a corrugated fashion in a direction normal to the transverse direction and continuously varies or is continuously inclined in the transverse direction. The reason for this is that the order (governed by the specific gravity) of the gradient layer is disturbed because the particles which have a particle size distribution of 6 $\mu$m or less are deflocculated and less liable to be governed by the specific gravity.

Figure 7:
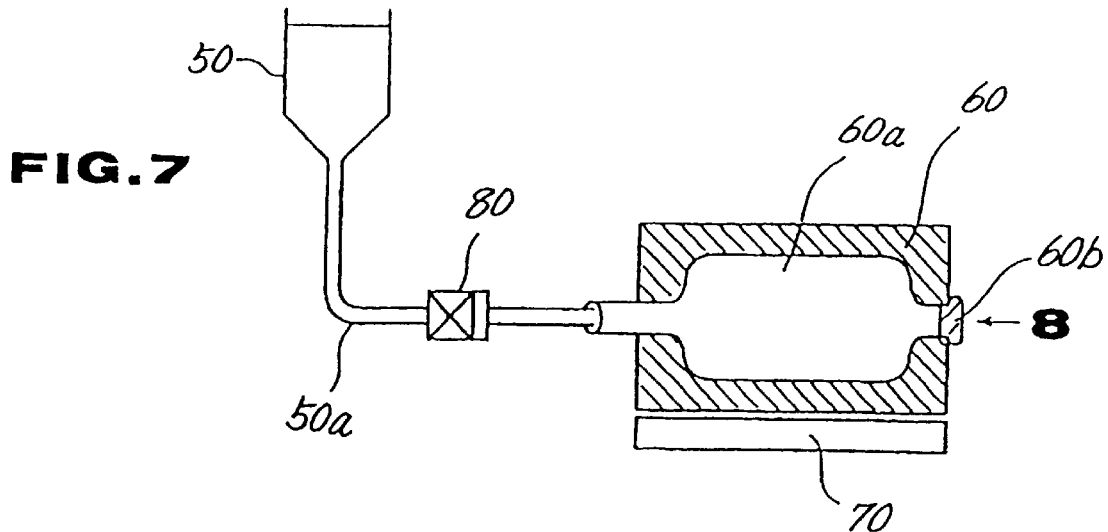
FIG. 7 is a cross-sectional view of an actual manufacturing apparatus for use in the method of manufacturing a gradient function material according to the first embodiment.
Figure 8:
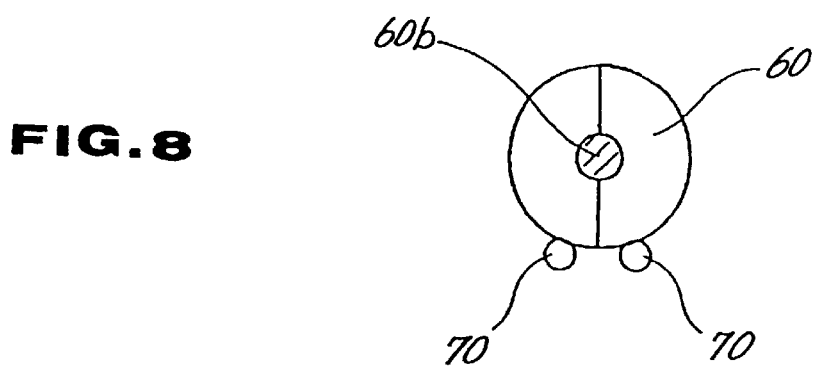
FIG. 8 is a view as viewed in the direction indicated by the arrow 8 in FIG. 7.

FIG. 7 is a cross-sectional view of a manufacturing apparatus for use in the method of manufacturing a gradient function material according to the first embodiment, and FIG. 8 is a view as viewed in the direction indicated by the arrow 8 in FIG. 7.

In the manufacturing apparatus, a plaster mold 60 which can be divided into halves is set on a pair of rotatable rollers 70 which extend horizontally, and one end of a cylindrical cavity 60a defined in the plaster mold 60 and a hopper 50 are interconnected by a pipe 50a and a rotary joint 80. The other end of the cylindrical cavity 60a is closed by a cap 60b.

Figure 9:
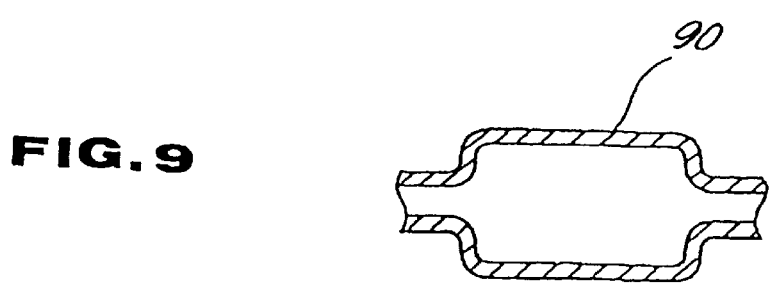
FIG. 9 is a cross-sectional view of a gradient function material manufactured by the manufacturing apparatus shown in FIG. 7.

In operation, a nickel slurry S1 is supplied from the hopper 50 into the cavity 60a in the plaster mold 60, which is then rotated at 10–15 rpm to deposit the slurry on an inner circumferential surface of the cavity 60a. Thereafter, a mixed slurry S2 of a nickel slurry and an alumina slurry is supplied from the hopper 50 into the cavity 60a, and deposited in the cavity 60a. In this manner, a tubular body 90 is produced which is nickel-rich in its outer region, an alumina-rich in its inner region, and has a gradient material or layer in its intermediate region. A cross-sectional view of the tubular body 90 is shown in FIG. 9.

In this embodiment, a first slurry is made of alumina particles and a second slurry is made of nickel particles. However, SiC, zirconia, or the like may be used instead of alumina particles, and W, Cr, Ta, or the like may be used instead of nickel particles. Stated otherwise, a first slurry may be made of a group of particles having a small specific gravity, and a second slurry may be made of a group of particles having a large specific gravity.

The first group of particles having a small specific gravity may comprise one or a plurality of groups of non-metal particles having a maximum particle diameter equal to or smaller than the deflocculation limit (6 $\mu$m), such as of an oxide such as alumina, zirconia, magnesia, silica, or the like, a carbide such as silicon carbide, titanium carbide, or the like, a nitride such as silicon nitride, and an oxynitride such as AlON or the like. The second group of particles having a large specific gravity may comprise a group of metal particles of an alloy of nickel, tungsten, molybdenum, tantalum, chromium, or the like, the metal particles having a high melting point, a specific gravity which is 1.5 times that of the first group of particles or greater, and particle diameters distributed across the deflocculation limit (6 μm).

FIG. 10 is a comparison table showing characteristics of a gradient function material manufactured by the method of manufacturing a gradient function material according to the first embodiment and conventional gradient function materials after they are fired. FIG. 11 is a comparison table showing characteristics of the method of manufacturing a gradient function material according to the first embodiment and conventional methods.

As can be seen from the comparison tables of FIGS. 10 and 11 and understood from the above discussion of Background Art, the gradient function material according to the first embodiment can achieve a required thickness in a much larger and complete range from the gradient function materials according to the conventional methods. Specifically, the gradient layer produced by vacuum evaporation such as CVD has a maximum thickness of several hundreds μm, and the gradient layer produced by centrifugal separation or solid-liquid separation using a filter has a minimum thickness of several mm, whereby there is a large gap or empty region in the thicknesses for the gradient layer which may be achieved using conventional methods. According to the present manufacturing method, it is possible to manufacture a gradient layer having a thickness ranging from several hundreds μm to ten mm or more.

With the method of manufacturing a gradient function material according to the first embodiment, the composition of particles making up the produced gradient function material continuously varies in a transverse direction thereof as if in transversely superposed corrugated patterns. Therefore, the gradient function material according to the present invention is less liable to peel off in thin layers and is more resistant to thermal stresses than the conventional gradient function materials which are composed of laminae arranged regularly as substantially horizontal stripes.

In the manufacturing method according to the first embodiment, furthermore, since a gradient layer is formed by being deposited in a plaster mold, any conventional hydrating step is not necessary. Because no hydrating step is required, the manufacturing process is simplified, and the gradient layer can keep its shape because a pressing step is also not required. In addition, the gradient function material is not limited to a plate shape, but can be formed to any desired shape.

In the manufacturing method according to the first embodiment, because no vacuum pump and no rotating device for producing centrifugal forces, or no filter is needed, the apparatus may be of a simplified design, which gives an advantage as to the cost.

A method of manufacturing a gradient function material according to a second embodiment of the present invention and a gradient function material manufactured according to such a method will be described below with reference to FIGS. 12(a) and 12(b) through 23.

Figure 12A:
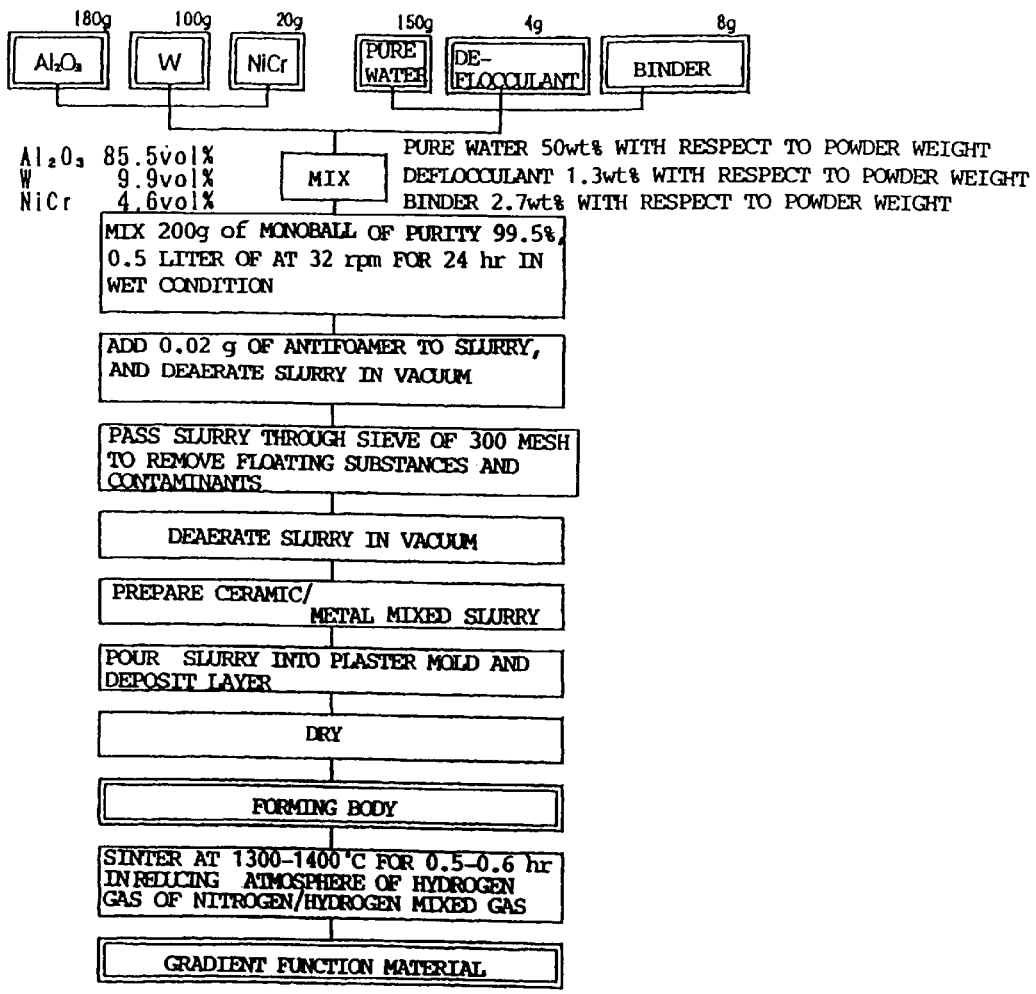
FIG. 12(a) is a flowchart of a basic manufacturing process in a method of manufacturing a gradient function material according to a second embodiment of the present invention.

FIG. 12(a) is a flowchart of a basic manufacturing process in a method of manufacturing a gradient function material according to a second embodiment of the present invention. In FIG. 12(a), a group of particles of $Al_2O_3$ is used as a group of particles having a small specific gravity, a group of particles of W is used as a group of particles having a large specific gravity, and a sintering assistant of NiCr (80/20) is used.

Figure 13A:
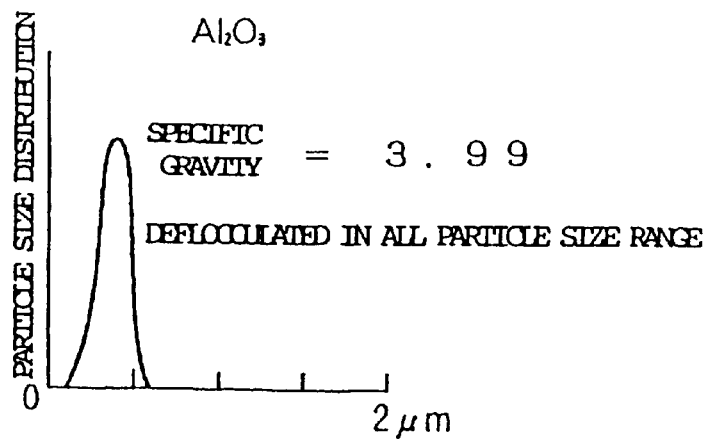
FIG. 13(a) is a graph showing a particle size distribution of $Al_2O_3$ used in the manufacturing process shown in FIG. 12(a)

As shown in FIG. 13(a), particles of $Al_2O_3$ having a particle diameter of 0.5 μm or less are selected. Since the limit particle diameter within which a deflocculating effect is exhibited with respect to $Al_2O_3$ is about 6.0 μm, all particles of $Al_2O_3$ having a particle diameter of 0.5 μm or less are deflocculated.

The specific gravity of $Al_2O_3$ is 3.99 (20° C.). Particles having a small specific gravity (small-specific-gravity particles) which may be employed instead of $Al_2O_3$ are preferably one or a plurality of groups of non-metal particles having a specific gravity ranging from 3 to 7 and a maximum particle diameter equal to or smaller than the deflocculation limit, such as of an oxide such as zirconia, magnesia, silica, or the like, a carbide such as silicon carbide, titanium carbide, or the like, a nitride such as silicon nitride, and an oxynitride such as AlON or the like.

Figure 13B:
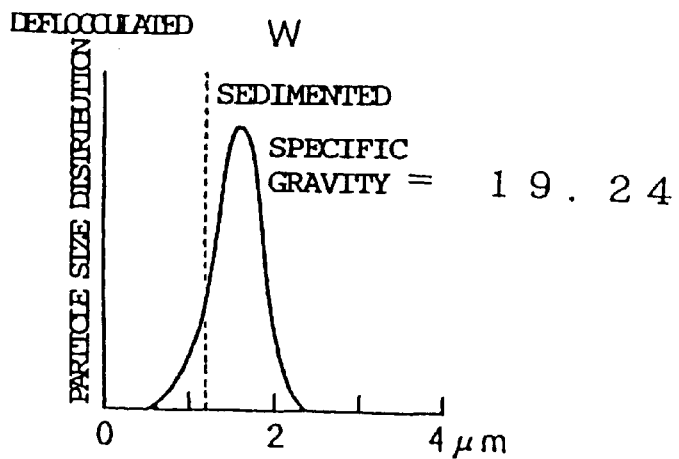
FIG. 13(b) is a graph showing a particle size distribution of W used in the manufacturing process shown in FIG. 12(a)

Particles of W (tungsten) having a particle diameter ranging from 0.5 μm to 2.3 μm are selected as shown in FIG. 13(b). Since the limit particle diameter within which a deflocculating effect is exhibited with respect to W is about 1.0 μm, some particles of W are deflocculated and the remaining particles of W are sedimented.

The specific gravity of W is 19.24 (20° C.) Particles having a large specific gravity (large-specific-gravity particles) which may be employed instead of W are preferably metal particles of Mo (molybdenum), Ni (nickel), Ta (tantalum), Cr (chromium), or their alloys, the metal particles having a high melting point, a specific gravity which is 1.5 times that of the small-specific-gravity particles or greater, and particle diameters distributed across the deflocculation limit.

Figure 13C:
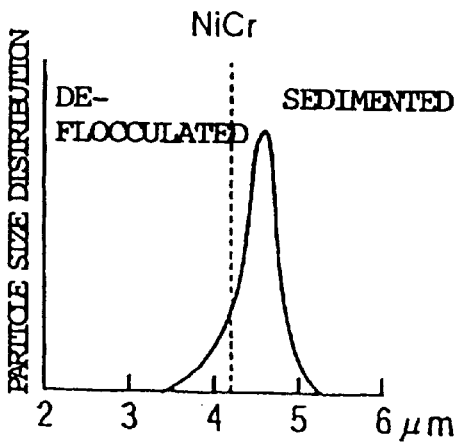
FIG. 13(c) is a graph showing a particle size distribution of NiCr used in the manufacturing process shown in FIG. 12(a)

Since NiCr is used as a sintering assistant for sintering W at low temperature, it is necessary for the sintering assistant of NiCr to be deflocculated and sedimented in a manner similar to W. Therefore, particles of NiCr having a particle diameter ranging from about 3.5 μm to 5.2 μm are selected as shown in FIG. 13(c).

Figure 12B:
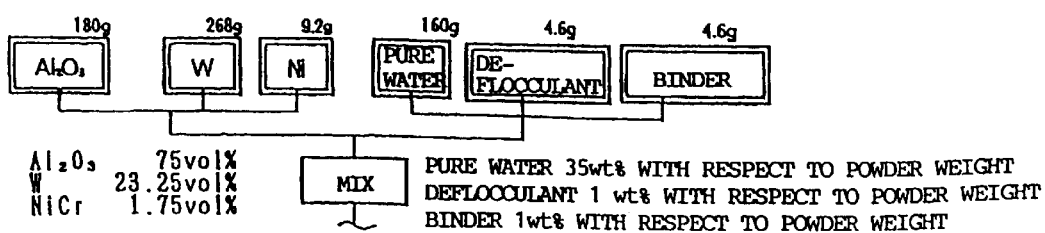
FIG. 12(b) is a flowchart of a manufacturing process which employs a sintering assistant different from a sintering assistant used in the manufacturing process shown in FIG. 12(a)

The sintering assistant which may be added instead of NiCr may comprise Ni powder, Cr powder, Co powder, Cu powder, Ti powder, or their mixtures, as shown in FIG. 12(b) (the steps following the mixing step in FIG. 12(b) are omitted from illustration as they are the same as those shown in FIG. 12(a)). The sintering assistant should preferably be added in 5 to 50 parts with respect to 100 parts (by volume) of the large-specific-gravity particles such as of tungsten, molybdenum, or the like. The sintering temperature varies depending on the selected sintering assistant. For example, when the sintering assistant is of NiCr and Ni, the sintering temperature ranges from 1300 to 1400° C., and when the sintering assistant is of Cu, the sintering temperature ranges from 1270 to 1320° C.

The above starting materials are weighed, and mixed with pure water, a deflocculant, and a binder in a monopot, after which an antifoamer is added to the mixture. The mixture is then deaerated in vacuum and sieved by a sieve of 300 mesh to remove floating substances and contaminants. An antifoamer is further added to the mixture, and the mixture is deaerated in vacuum, thus producing a mixed slurry S (ceramic/metal mixed slurry) containing a group of small-specific-gravity particles of $Al_2O_3$, etc. and a group of large-specific-gravity particles of W, etc.

The mixed slurry S is then poured into a plaster mold, deposited, and dried into a forming body, which is thereafter sintered in a reducing atmosphere thereby producing a gradient function material.

Instead of the plaster mold, there may be employed a porous resin mold made of alumina cement, phenolic resin, or the like, or a porous ceramic mold. These molds should have pore diameters which are 2 or 3 times those of particles to be molded (equal to or smaller than those of secondary agglomerated particles). The material of the resin or ceramic mold should be selected which does not contain light elements (Mg or the like) that adversely affects the sintered body.

Various steps to be carried out after a mixed slurry S is poured into a plaster mold until a gradient function material is produced will be described below with reference to FIGS. 14(a) through 14(e). FIGS. 14(a) through 14(e) are cross-sectional views showing a process of manufacturing a sealing cap for a metal vapor discharge lamp as a gradient function material.

As shown in FIG. 14(a), a container coated with wax on its inner surface, such as a glass tube 2, is set on a plaster mold 10 (such as a mold which meets the requirements under JIS R9111), and the mixed slurry S is poured into the glass tube 2.

The region of the poured mixed slurry S which is held in contact with the plaster mold 10 is deposited as dominated by being attracted by the plaster mold 10. As a result, the composition of the deposited region is the same as the composition of the slurry S itself.

After the deposition dominated by being attracted by the plaster mold 10 is completed, the mixed slurry S is deposited as dominated by the specific gravity and the deflocculated condition. Specifically, all the particles of $Al_2O_3$ are difficult to be deposited as they are deflocculated and suspended while being repelled by each other. Some of the particles of W are deflocculated, and the remaining particles of W are not in a deflocculated condition. Therefore, after particles of W are deposited as being dominated by being attracted by the plaster mold 10, particles of W which are not in a deflocculated condition are sedimented.

The particles in the deflocculated condition are gradually deposited due to gravity. At this time, the particle size distribution of the particles of W is greater than the particle size distribution of the particles of $Al_2O_3$ and the specific gravity of W is greater than (more than twice) the specific gravity of $Al_2O_3$, as shown in FIGS. 13(a) and 13(b). Therefore, as shown in FIG. 14(b), there is produced a gradient function material forming body 3 with the composition of its gradient layer varying continuously such that there exists a large-specific-gravity region 3a which is occupied mostly by large-specific-gravity particles of W intermediate (in a position close to the bottom in the second embodiment) in the transverse direction (casting direction), and the proportion of small-specific-gravity particles of $Al_2O_3$ progressively increases transversely from the large-specific-gravity region 3a.

Figure 18:
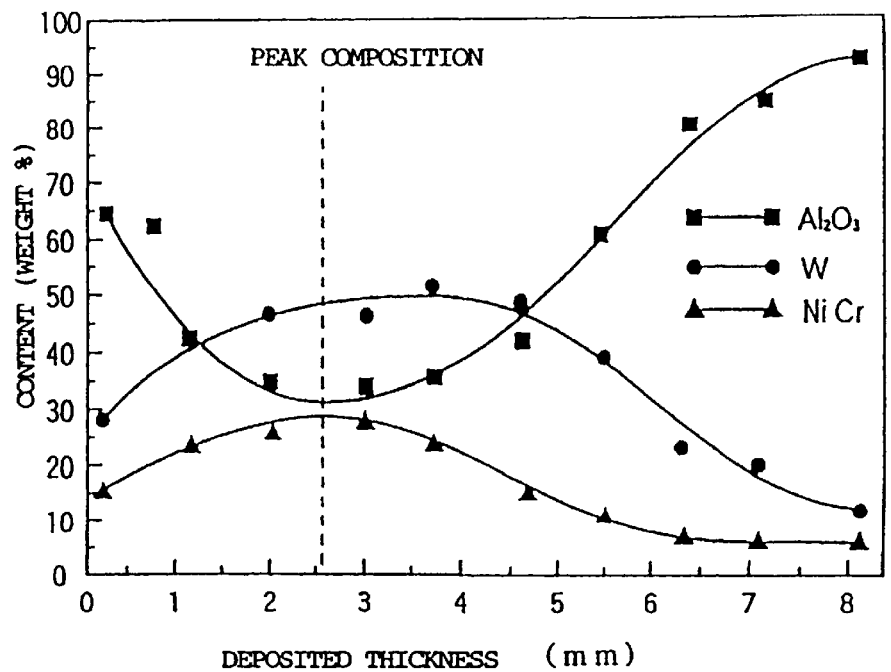
FIG. 18 is a graph showing a composition in the transverse direction of a gradient function material forming body shown in FIG. 14(b)

As shown in FIG. 18, which is a graph showing the composition in the transverse direction of the gradient function material forming body 3, the gradient function material forming body 3 exhibits a peak composition of a gradient function material in the large-specific-gravity region 3a. Since an end 3b of the gradient function material forming body 3 which is held in contact with the plaster mold 10 is formed as dominated by being attracted by the plaster mold 10, the composition of the end 3b is close to the composition of the mixed slurry S. The composition of an opposite end 3c is occupied mostly by particles of $Al_2O_3$.

Figure 23:
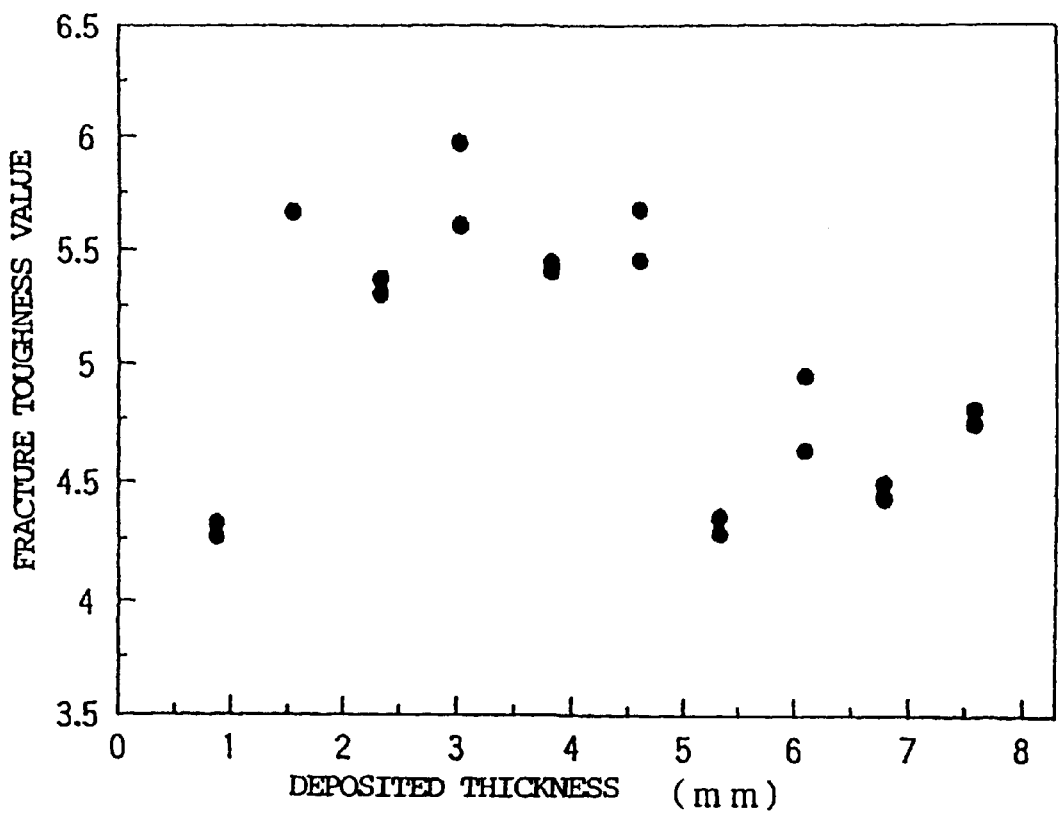
FIG. 23 is a graph showing the relationship between the deposited thickness and the fracture toughness value of the gradient function material forming body shown in FIG. 14(b)
Figure 21:
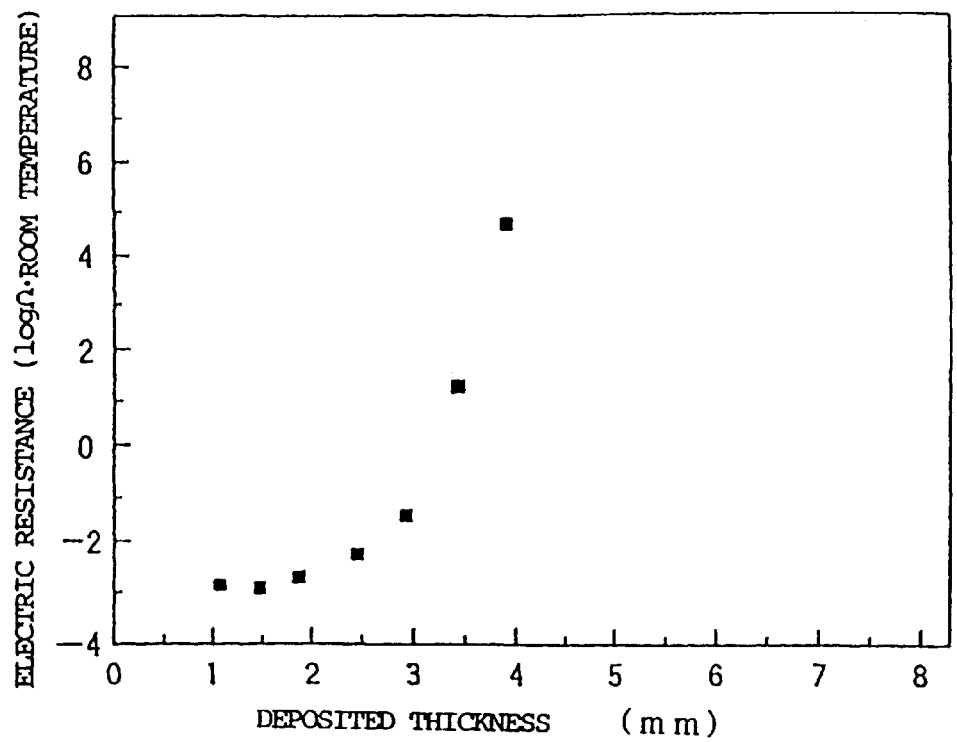
FIG. 21 is a graph showing the relationship between the deposited thickness and the electric resistance of the gradient function material forming body shown in FIG. 14(b)
Figure 22:
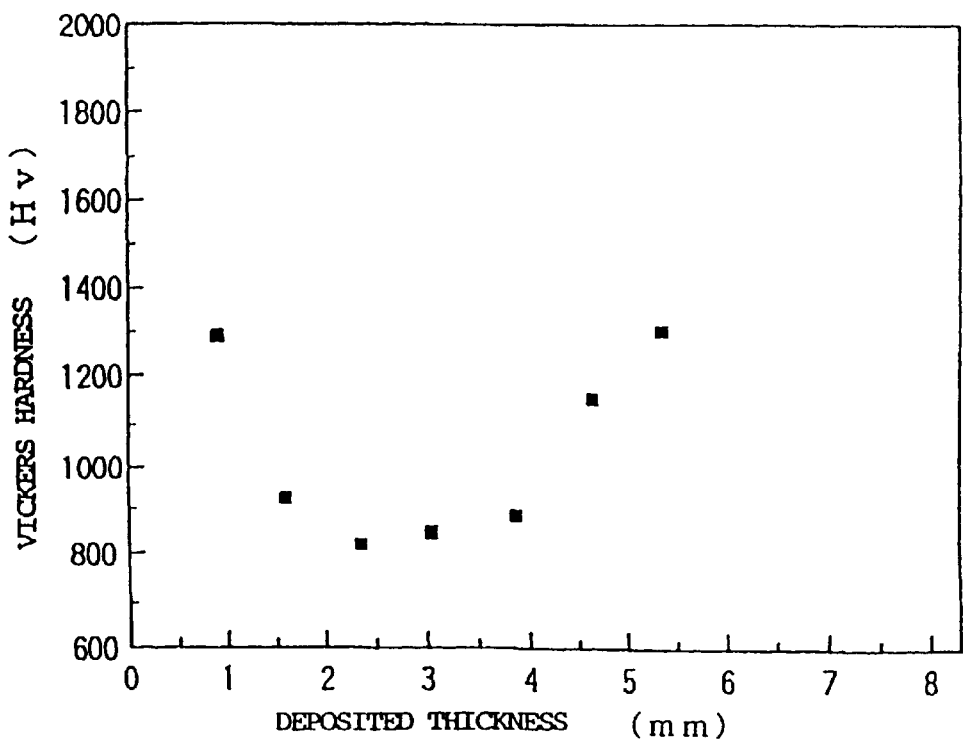
FIG. 22 is a graph showing the relationship between the deposited thickness and the Vickers hardness of the gradient function material forming body shown in FIG. 14(b)

Results of experimentation for properties (electric resistance, Vickers hardness, and fracture toughness) along the deposited thickness of the gradient function material forming body 3 are shown in FIGS. 21, 22, and 23. These experimental results indicate that the gradient function material forming body 3 has property peaks corresponding to the peak composition in the intermediate region 3a.

Figure 15:
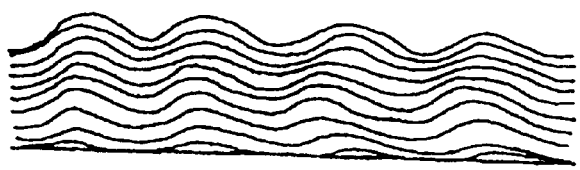
FIG. 15 is an enlarged cross-sectional view of a gradient function material manufactured by the method of manufacturing a gradient function material according to the second embodiment.
Figure 25:
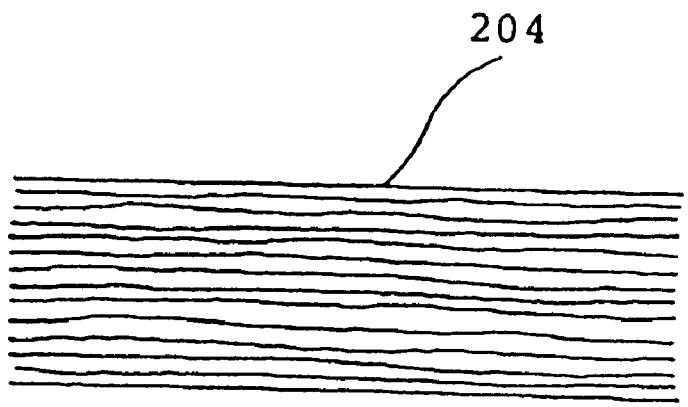
FIG. 25 is a cross-sectional view of a gradient layer in a gradient function material produced by a conventional method of manufacturing a gradient function material.

As described above with reference to FIG. 25, the gradient pattern of a gradient function material manufactured by the conventional method is such that the stripe laminae of the gradient layer are liable to peel off because they are superposed too orderly in the transverse direction. As with the first embodiment, the gradient function material according to the second embodiment is not produced by deflocculating particle groups in the slurry and sedimenting and depositing the particles as dominated by only the specific gravity. Therefore, the order of the gradient layer (which is dominated by the specific gravity) is disturbed, resulting in a gradient pattern which continuously varies in a transverse direction thereof as if as if in transversely superposed corrugated patterns, as shown in FIG. 15.

Since the gradient function material forming body 3 is used as a cap for a metal vapor discharge lamp in this embodiment, the portion below the large-specific-gravity region 3a is removed as by grinding after being dried as shown in FIG. 14(c), leaving the gradient function material forming body 3 free of peaks in the varying composition.

As shown in FIG. 14(d), the remaining gradient function material forming body 3 (including regions 3a, 3c) is either temporarily fired for 1 hour or directly processed to shape without being temporarily fired. When the remaining gradient function material forming body 3 is directly processed to shape, it is shaped to a dimension that matches the diameter of the mouth of a light-emitting tube taking into account the shrinkage which it suffers upon firing.

Then, the gradient function material forming body 3 is fired at 1350° C. for 6 hours, after which it is processed by HIP in an argon atmosphere. The gradient function material forming body 3 is formed into a cylindrical shape so as to be suitable for use as a sealing cap. Electrode holes 4a, 4b are defined in the gradient function material forming body 3. Then, as shown in FIG. 14(e), an inner electrode 5a is pressed into the electrode hole 4a, and an outer electrode 5b is pressed into the electrode hole 4b, thus producing a sealing cap 6. A metal solder material may be put between the electrodes and the electrode holes when the electrodes are pressed into the electrode holes.

Figure 16A:
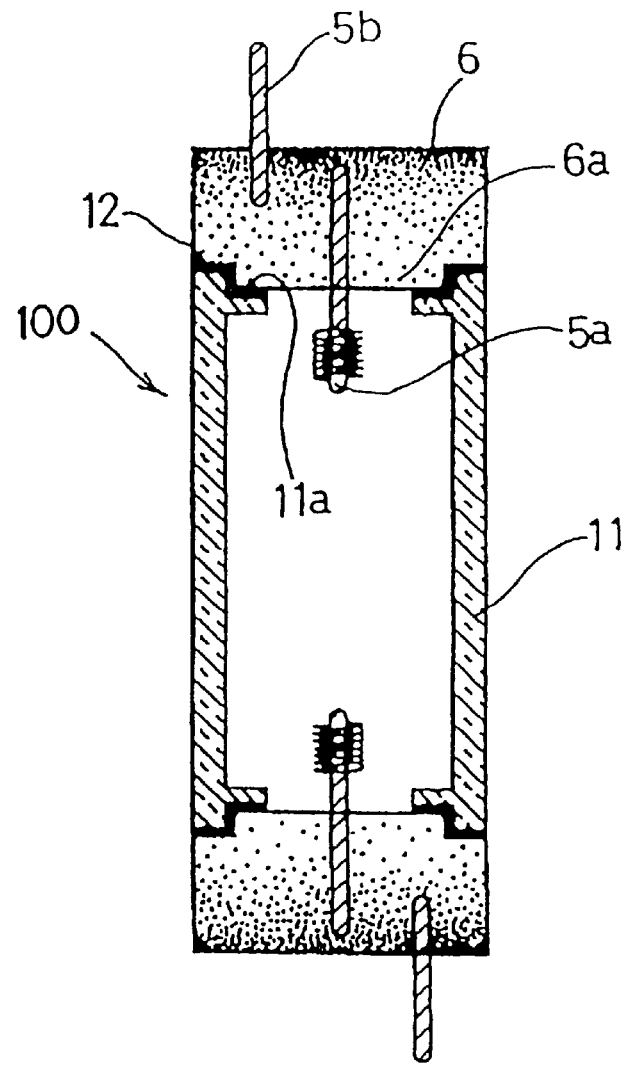
FIG. 16(a) is a cross-sectional view of a bulb for a metal vapor discharge lamp using the sealing cap manufactured according to the manufacturing process shown in FIG. 12(a)

FIG. 16(a) shows a bulb 100 for a metal vapor discharge lamp with the sealing cap 6 mounted thereon. The sealing cap 6 has a projection 6a on its distal end which is securely fitted in a recess 11a defined in an end of a tubular light-transmissive light-emitting tube 11 which is made of polycrystalline alumina. For securing the sealing cap 6 to the tubular light-transmissive light-emitting tube 11, the portion of the sealing cap 6 to be held against an open end of the light-emitting tube 11 is composed of the end 3c which is occupied mostly by particles of $Al_2O_3$, and the coefficient of thermal expansion of that portion of the sealing cap 6 is selected to be substantially equal to the coefficient of thermal expansion of light-transmissive alumina of which the light-emitting tube 11 is made. The sealing cap 6 is secured to the tubular light-transmissive light-emitting tube 11 by placing a sealing material 12 such as a glass solder or the like between the recess 11a and the projection 6a, and heating the sealing material 12 with high-frequency energy or infrared radiation.

Figure 16B:
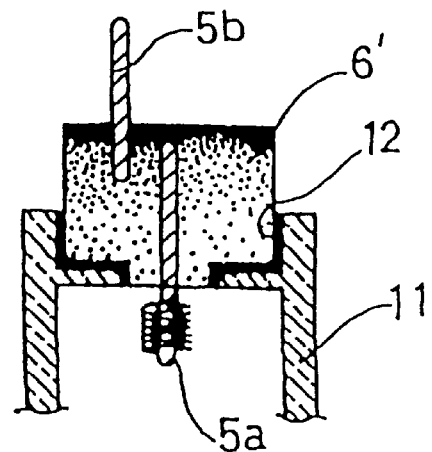
FIG. 16(b) is a fragmentary cross-sectional view of a sealing cap which is of a type different from the sealing cap shown in FIG. 16(a)

FIG. 16(b) shows another type of sealing cap 6'. In this type, the sealing cap 6' has an outside diameter smaller than the outside diameter of the light-emitting tube 11. The other structural details are the same as those shown in FIG. 16(a).

Figure 17A:
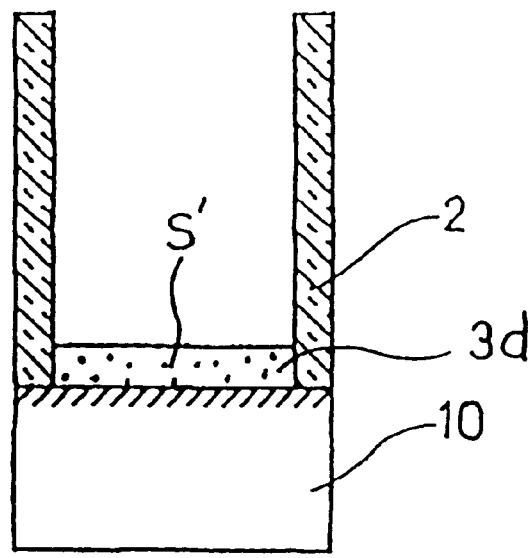
FIGS. 17(a) and 17(b) are views showing a method of manufacturing a gradient function material according to a first modification of the method of manufacturing a gradient function material according to the second embodiment.
Figure 17B:
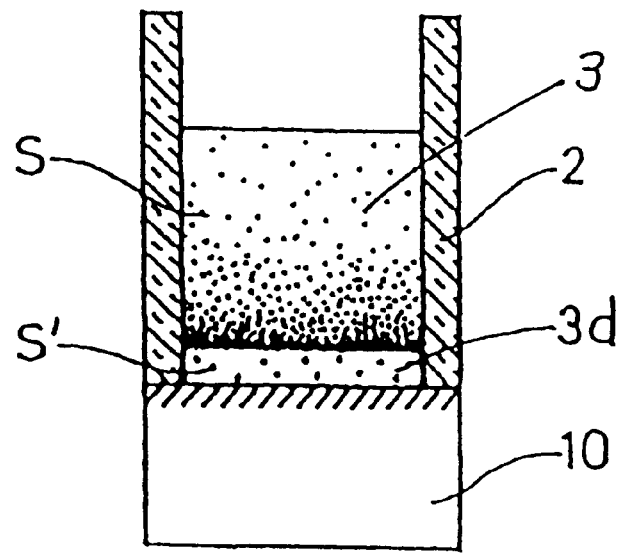

FIGS. 17(a) and 17(b) are views showing a method of manufacturing a gradient function material according to a first modification of the method of manufacturing a gradient function material according to the second embodiment shown in FIGS. 14(a) through 14(e). In the manufacturing method according to the first modification, as shown in FIG. 17(a), a single slurry S' containing only particles of $Al_2O_3$ (particles having a small specific gravity) is supplied into a glass tube 2 on a plaster mold 1 and deposited therein as a deposited layer 3d. Then, as shown in FIG. 17(b), a mixed slurry S of particles of $Al_2O_3$ and particles of W is supplied into the glass tube 2, and the particles in the mixed slurry S are deposited successively from the particles of W that are more susceptible to gravity, onto the deposited layer 3d of $Al_2O_3$.

Now, as shown in FIG. 17(b), a gradient composition region whose composition continuously varies transversely is formed on the deposited layer 3d which is composed of 100% of $Al_2O_3$ with a clear boundary defined therebetween. The gradient composition region is formed as dominated by the specific gravity and deflocculation, but not essentially affected by any attraction from the plaster mold 10, and hence is free of any peak compositions.

Thereafter, the deposited layer 3d is removed, producing a gradient function material forming body 3 for use as a material of the sealing cap 6. A mixed slurry S may be supplied twice, rather than supplying the single slurry S'. However, since the boundary would be blurred, it is preferable to employ the single slurry S'.

Figure 19:
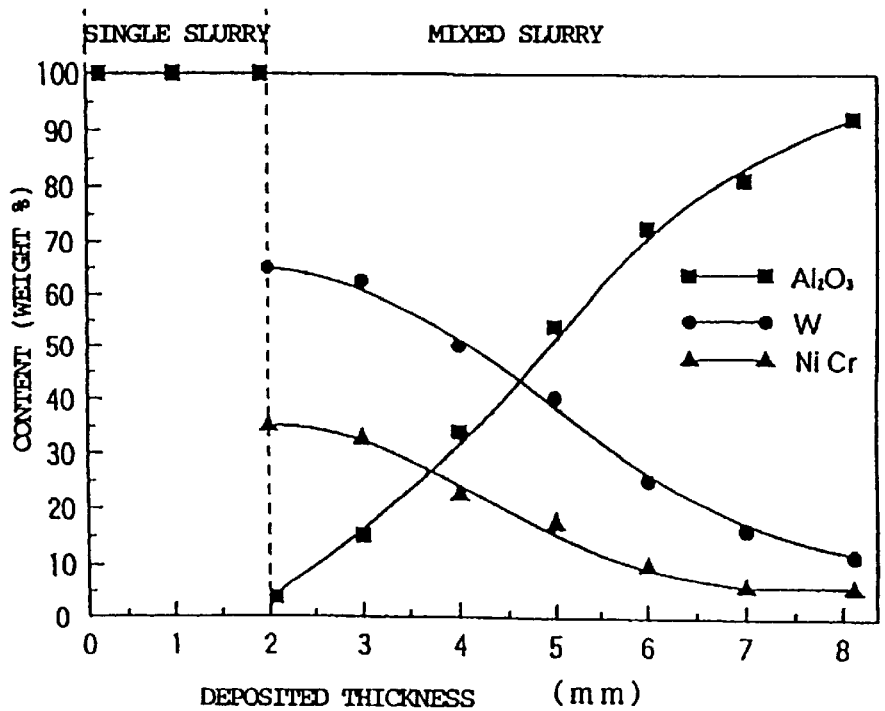
FIG. 19 is a graph showing a composition in the transverse direction of a gradient function material forming body shown in FIG. 17(b)

FIG. 19 is a graph showing a composition in the transverse direction of a gradient function material forming body shown in FIG. 17(b).

Figure 20A:
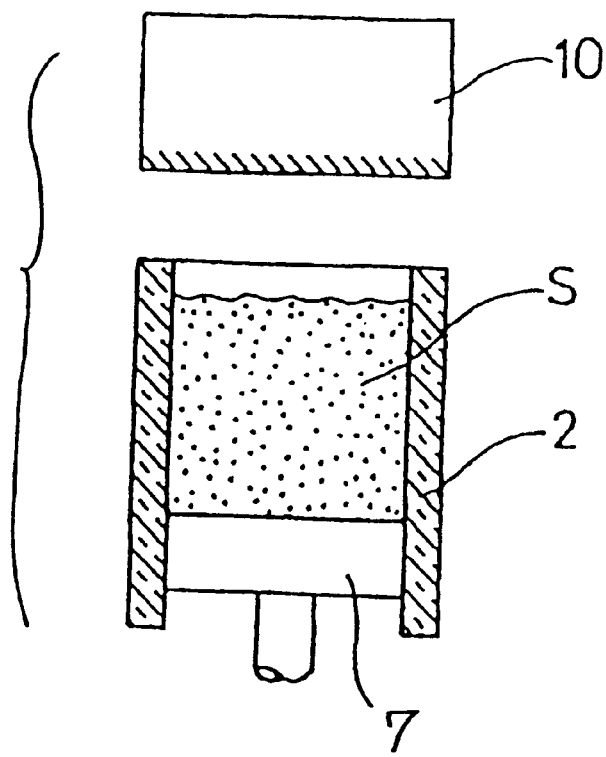
FIGS. 20(a) and 20(b) are views showing a method of manufacturing a gradient function material according to a second modification of the method of manufacturing a gradient function material according to the second embodiment.
Figure 20B:
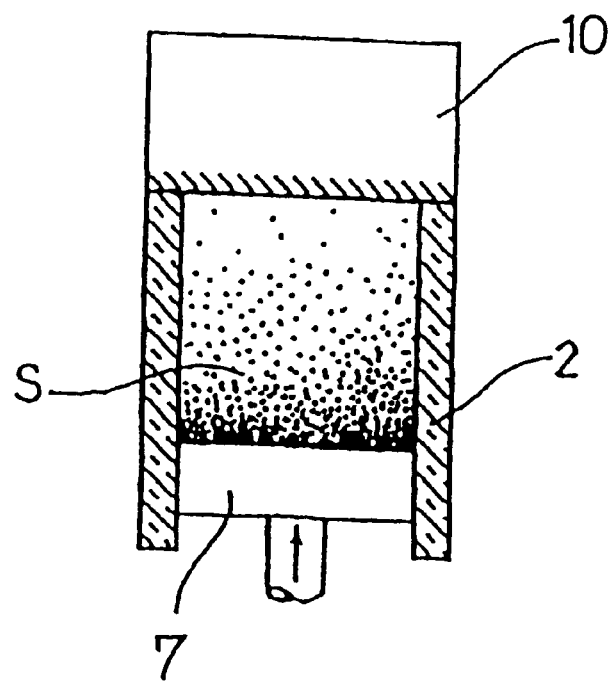

FIGS. 20(a) and 20(b) are views showing a method of manufacturing a gradient function material according to a second modification of the method of manufacturing a gradient function material according to the second embodiment shown in FIGS. 14(a) through 14(b).

In the manufacturing method according to the second modification, as shown in FIG. 20(a), a piston 7 is fitted in a bottom of a glass tube 2 as a container, the piston 7 being slidable along an inner surface of the glass tube 2. Then, a mixed slurry S containing a group of particles having a small specific gravity and a group of particles having a large specific gravity is supplied into the glass tube 2.

Thereafter, the mixed slurry S is held at rest for a predetermined period of time until large-specific-gravity particles are of a progressively greater proportion from upper toward lower layers in the composition of the mixed slurry S in the glass tube 2, i.e., the upper layer is occupied mostly by particles of $Al_2O_3$, whereupon a plaster mold 10 is brought into contact with the upper surface of the mixed slurry S, and the piston 7 is elevated to pressurize the mixed slurry S to deposit the slurry on the surface of the plaster mold 10, as shown in FIG. 20(b).

In this manner, there is produced a gradient function material whose composition varies only in one direction, without foaming and subsequently removing the deposited layer 3d as with the first modification.

As described above, the present invention offers the following advantages:

The gradient function material according to the present invention can achieve a required thickness in a much larger and complete range than the gradient function materials according to the conventional methods. Specifically, the gradient layer produced by vacuum evaporation such as CVD has a maximum thickness of several hundreds $\mu m$, and the gradient layer produced by centrifugal separation or solid-liquid separation using a filter has a minimum thickness of several mm, whereby there is a large gap or empty region in the thicknesses for the gradient layer which may be achieved using conventional methods. With the method of manufacturing a gradient function material according to the present invention, it is possible to manufacture a gradient layer having a thickness ranging from several hundreds $\mu m$ to ten mm or more.

The composition of particles making up the gradient function material continuously varies in a transverse direction of the gradient layer thereof as if in transversely superposed corrugated patterns. Therefore, the gradient function material is less liable to peel off in thin layers and is more resistant to thermal stresses than the conventional gradient function materials which are composed of laminae arranged regularly as stripes.

Since a gradient layer can be formed by deposition using a plaster mold and one type of slurry, any conventional dehydrating step becomes unnecessary, resulting in a simplified process.

Because no vacuum pump and no rotating device for producing centrifugal forces, or no filter is needed, the apparatus may be of a simplified design, which gives an advantage as to the cost.

According to the second embodiment of the present invention, it is possible to form a gradient function material having a composition peak intermediate in the transverse direction. If a gradient function material with no composition peak is required, then the above gradient function material may be processed to shape as an intermediate product. If a single slurry containing a group of particles having a small specific gravity is first supplied into a plaster mold and deposited therein, and then a mixed slurry is supplied into the plaster mold, then since the boundary between a deposited region (with no composition peak) formed from the mixed slurry and a deposited region formed from the single slurry can clearly be distinguished, the deposited region formed from the single slurry can easily be removed subsequently by grinding or the like.

INDUSTRIAL APPLICABILITY

The gradient function material can be used as a heat resistant material in locations where the difference between inner and outer temperatures is very large, e.g., as a sealing cap for the bulb of a metal vapor discharge lamp, a surface layer material for a space shuttle, a nuclear fusion reactor, etc.

Although there have been described what are at present considered to be the preferred embodiments of the invention, it will be understood that the invention can be embodied in other specific forms without departing from the spirit or essential characteristics thereof. The present embodiments are, therefore, to be considered in all aspects as illustrative and not restrictive. The scope of the invention is indicated by the appended claims rather than by the foregoing description.

We claim:

1. A gradient function material produced by cast molding and thereafter firing a slurry which contains at least a first group of particles and a second group of particles, wherein said particles in said first group have a specific gravity which is less than the specific gravity of particles in said second group of particles, characterized in that:

the gradient function material has a first region disposed between ends thereof in a casting direction and occupied mostly by particles from said second group of particles, and a composition of said gradient function material varies continuously such that the proportion of particles from said first group of particles increases progressively from said first region toward both of the ends in the casting direction; and said composition of said gradient function material continuously varies in said casting direction in a substantially superposed corrugated pattern.

2. A gradient function material produced by cast molding and thereafter firing a slurry which contains at least a first group of particles and a second group of particles, wherein said particles in said first group have a specific gravity which is less than the specific gravity of particles in said second group of particles, characterized in that:

the gradient function material has a first region disposed between ends thereof in a casting direction and occupied mostly by particles from said second group of particles, and a composition of said gradient function material varies continuously such that the proportion of particles from said first group of particles increases progressively from said first region toward both of the ends in the casting direction; and a distribution of said composition of said gradient function material is based upon an extent of deflocculation of said first group of particles relative to said second group of particles.

3. A gradient function material produced by cast molding and thereafter firing a slurry which contains at least a first group of particles and a second group of particles, wherein said particles in said first group have a specific gravity which is less than the specific gravity of particles in said second group of particles, characterized in that:

the gradient function material has a first region disposed between ends thereof in a casting direction and occupied mostly by particles from said second group of particles, and a composition of said gradient function material varies continuously such that the proportion of particles from said first group of particles increases progressively from said first region toward both of the ends in the casting direction; and a distribution of said composition of said gradient function material is based upon an extent of deflocculation of said first group of particles relative to an extent of deflocculation of said second group of particles, and upon a specific gravity of particles in said first group relative to particles in said second group.

4. A gradient function material wherein, comprising:

a first group of particles;

a second group of particles wherein said particles in said first group have a specific gravity which is less than the specific gravity of said particles in said second group;

said gradient function material has a first region disposed between ends thereof in a casting direction and occupied mostly by particles from said second group of particles;

a distribution of particles from said first and second groups of particles in said gradient function material varies continuously such that the proportion of particles from said first group of particles increases progressively from said first region toward at least one end of said gradient function material in the casting direction;

said gradient function material is produced by cast molding and thereafter firing a slurry containing said first group of particles and said second group of particles; and a distribution of said composition of said gradient function material is based upon an extent of deflocculation of said first group of particles relative to said second group of particles.

5. A gradient function material, comprising:

a first group of particles;

a second group of particles, wherein said particles in said first group have a specific gravity which is less than the specific gravity of said particles in said second group;

said gradient function material has a first region disposed between upper and lower ends thereof in a transverse direction and occupied mostly by particles from said second group of particles;

a distribution of particles from said first and said second group of particles in said gradient function material varies continuously such that the proportion of particles from said first group of particles increases progressively from said first region toward at least one end of said gradient function material in the transverse direction; and wherein said gradient function material is produced by cast molding and thereafter firing a slurry containing said first group of particles, and said second group of particles; and a distribution of said composition of said gradient function material is based upon an extent of deflocculation of said first group of particles relative to an extent of deflocculation of said second group of particles, and upon a specific gravity of particles in said first group relative to particles in said second group.

6. A gradient function material, comprising:

a first group of particles;

a second group of particles wherein said particles in said first group have a specific gravity which is less than the specific gravity of said particles in said second group;

said gradient function material has a first region disposed between ends thereof in a casting direction and occupied mostly by particles from said second group of particles;

a distribution of particles from said first and second groups of particles in said gradient function material varies continuously such that the proportion of particles from said first group of particles increases progressively from said first region toward at least one end of said gradient function material in the casting direction;

said gradient function material is produced by cast molding and thereafter firing a slurry containing said first group of particles and said second group of particles; and said composition of said gradient function material has a substantially superposed, corrugated pattern in the casting direction.

* * * * *

UNITED STATES PATENT AND TRADEMARK OFFICE
CERTIFICATE OF CORRECTION

PATENT NO. : 5,943,546
DATED : August 24, 1999
INVENTOR(S) : Hirotaka Ishibashi, et. al.

It is certified that error appears in the above-identified patent and that said Letters Patent is hereby corrected as shown below:

Column 3, line 52, change "supplying a gravity" to --supplying a quantity--.

Column 7, line 35, change "6minutes" to --6 minutes--.

Column 8, line 50, delete "an".

Column 12, line 20, change "as if as if" to --as if--.

Column 13, line numbered between 41 and 42, change "14(*b*)" to --14(*e*)--;
line 62, change "foaming" to --forming--.

Column 15, line numbered approximately 53 (claim 4, line 1), delete "wherein".

Signed and Sealed this

Seventh Day of March, 2000

Attest:

Q. TODD DICKINSON

*Attesting Officer*  *Commissioner of Patents and Trademarks*